No. 682,775. Patented Sept. 17, 1901.
M. A. YEAKLEY.
AUTOMOBILE.
(Application filed Dec. 5, 1900.)
(No Model.) 6 Sheets—Sheet 2.

No. 682,775. Patented Sept. 17, 1901.
M. A. YEAKLEY.
AUTOMOBILE.
(Application filed Dec. 5, 1900.)

(No Model.) 6 Sheets—Sheet 4.

ATTEST
T. B. Moser
M. W. Sheehan

INVENTOR.
Melvin A. Yeakley

By H. T. Fisher, ATTY

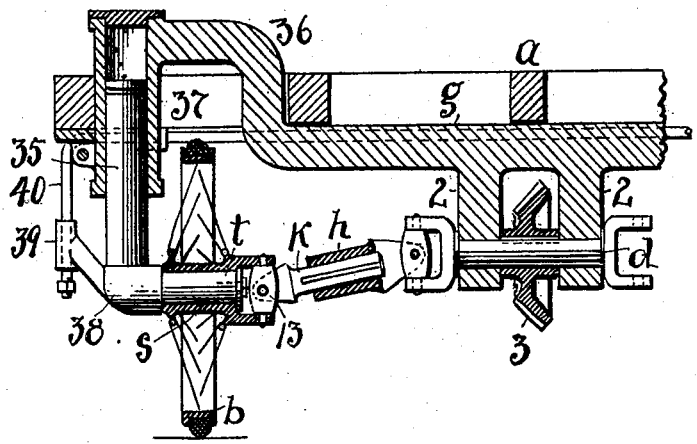
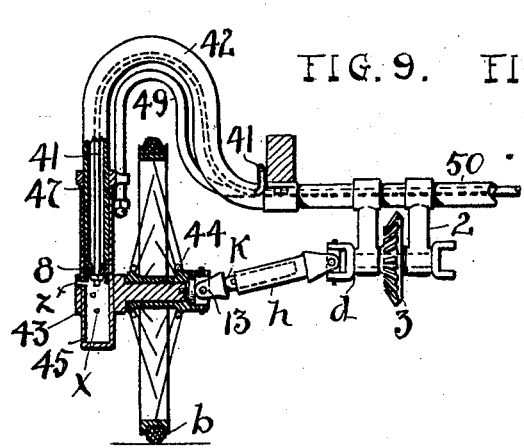
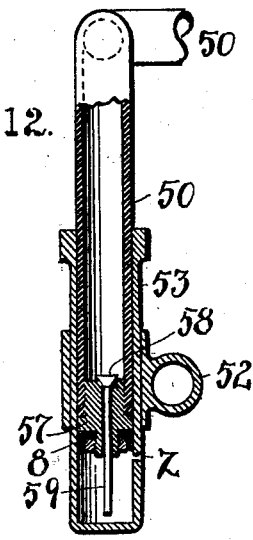
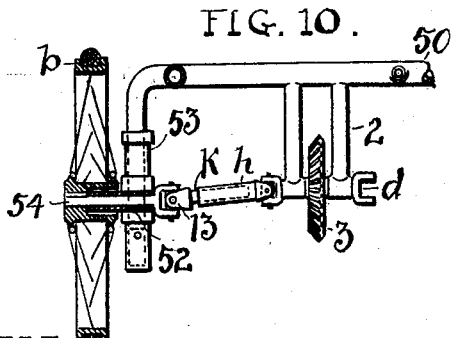
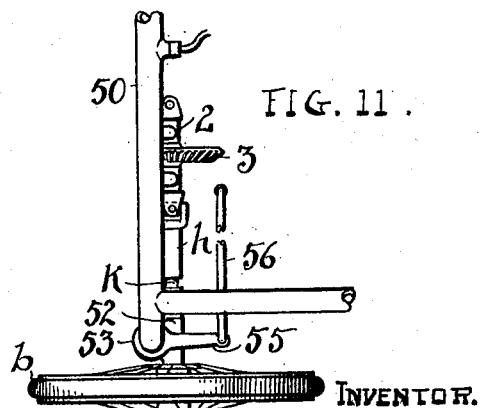

No. 682,775. Patented Sept. 17, 1901.
M. A. YEAKLEY.
AUTOMOBILE.
(Application filed Dec. 5, 1900.)

(No Model.) 6 Sheets—Sheet 6.

ATTEST. INVENTOR.
Melvin H. Yeakley
By H. T. Fisher ATTY

UNITED STATES PATENT OFFICE.

MELVIN A. YEAKLEY, OF KAMMS, OHIO.

AUTOMOBILE.

SPECIFICATION forming part of Letters Patent No. 682,775, dated September 17, 1901.

Application filed December 5, 1900. Serial No. 38,738. (No model.)

*To all whom it may concern:*

Be it known that I, MELVIN A. YEAKLEY, a citizen of the United States, residing at Kamms, in the county of Cuyahoga and State of Ohio, have invented certain new and useful Improvements in Automobiles; and I do declare that the following is a full, clear, and exact description of the invention, which will enable others skilled in the art to which it appertains to make and use the same.

My invention relates to automobiles; and the invention consists in the construction and arrangement of parts substantially as shown and described and particularly as pointed out in the claims.

Figure 1:
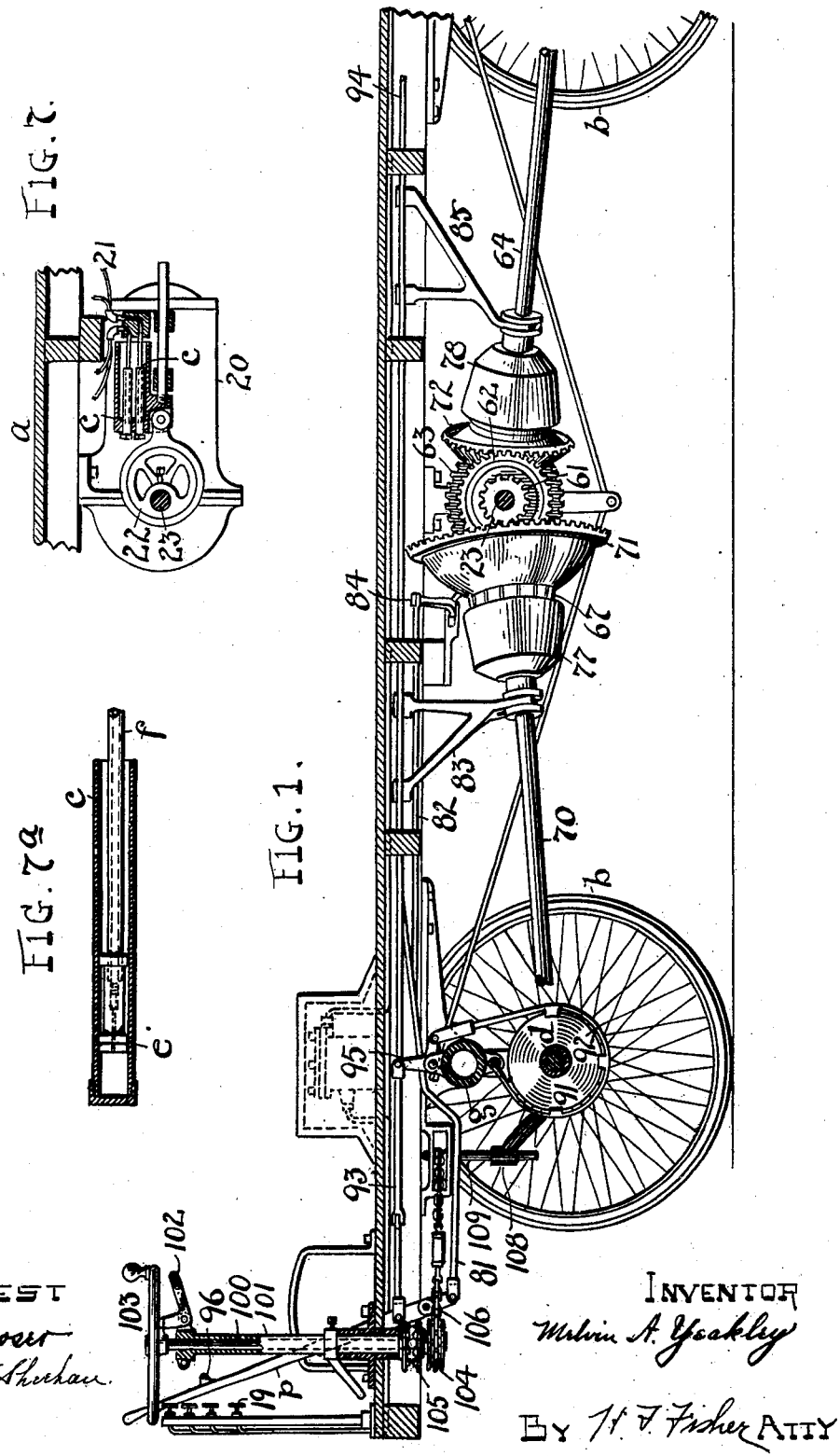
Figure 2:
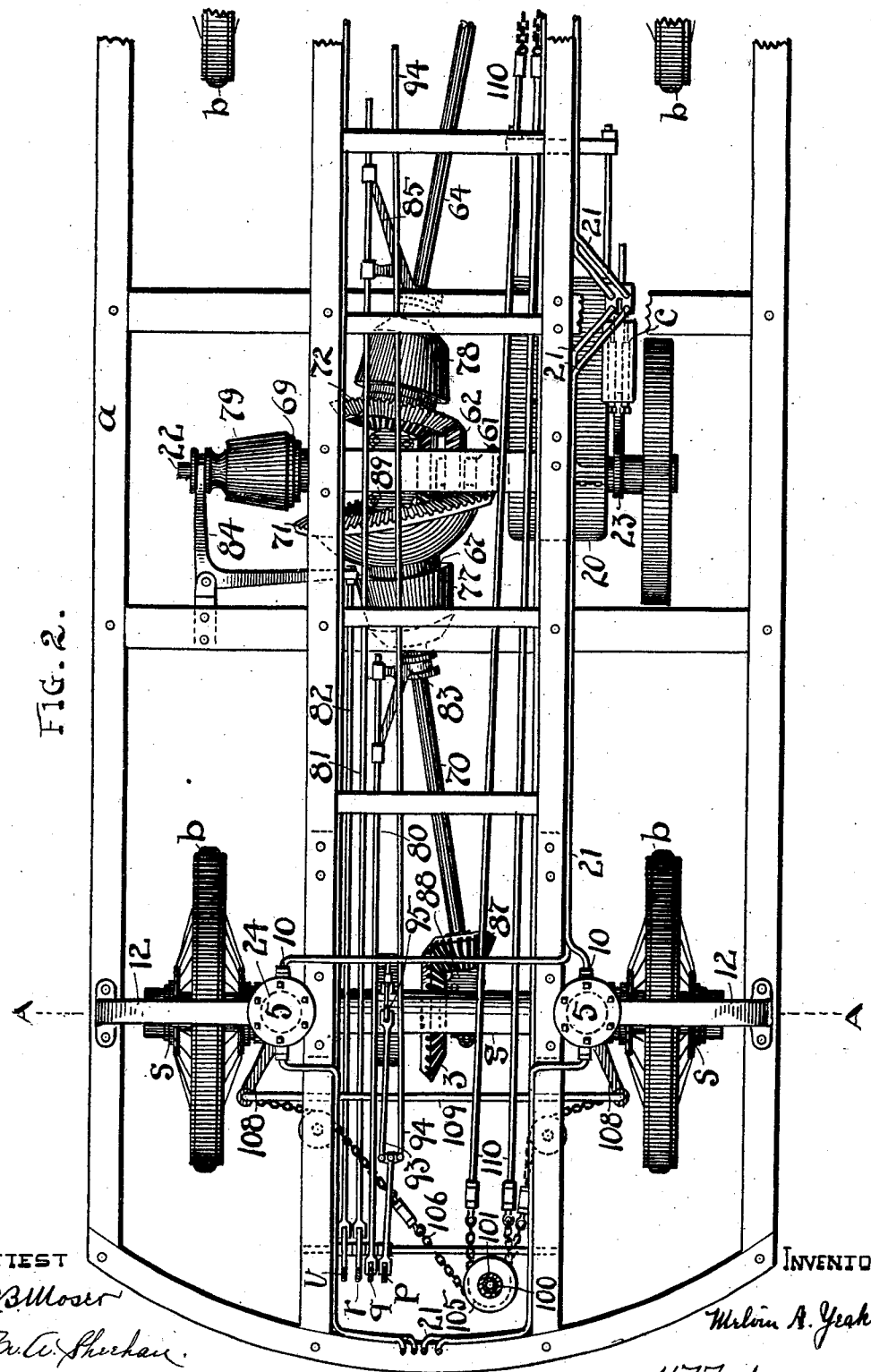
Figure 3:
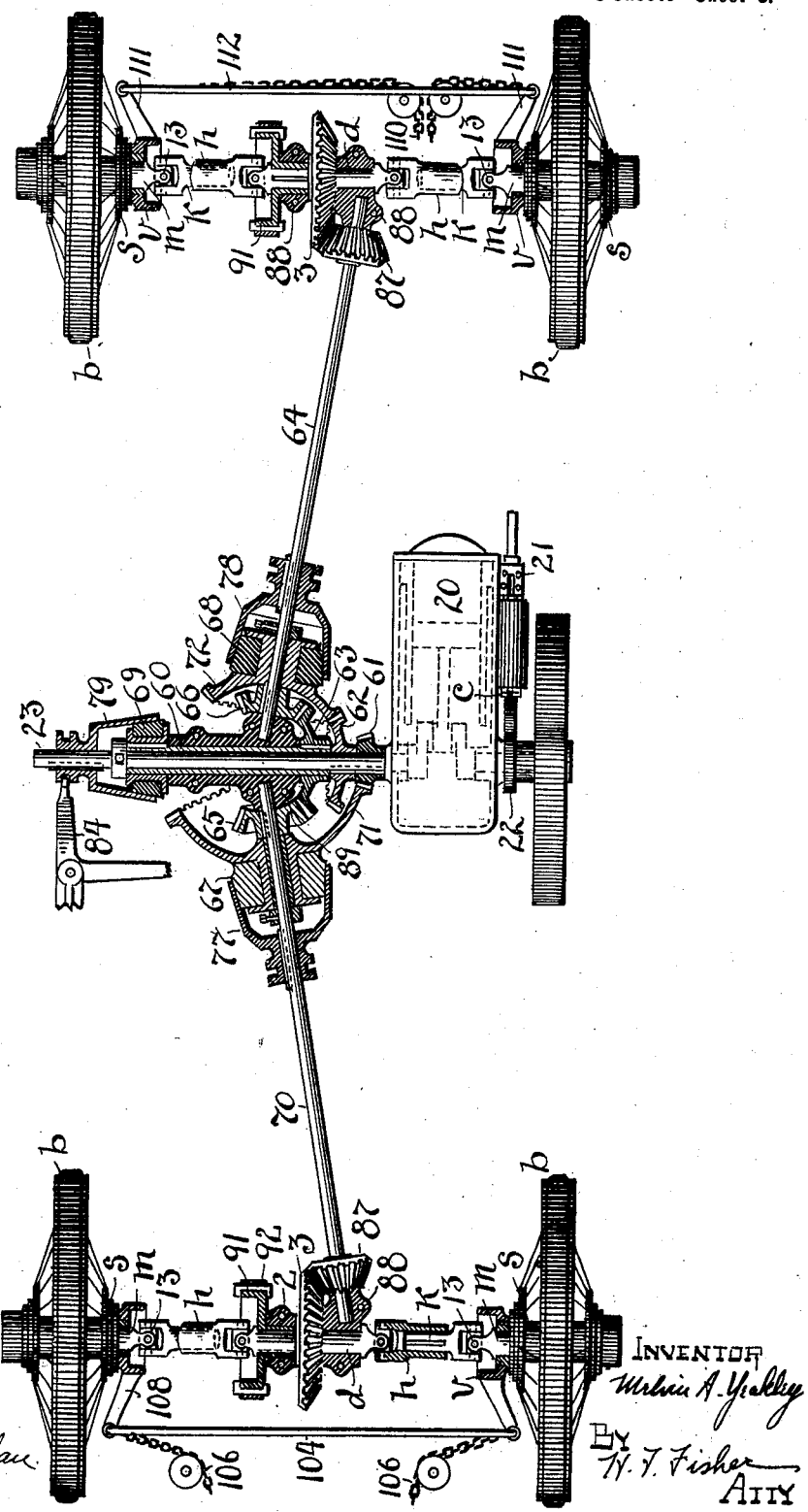
Figure 4:
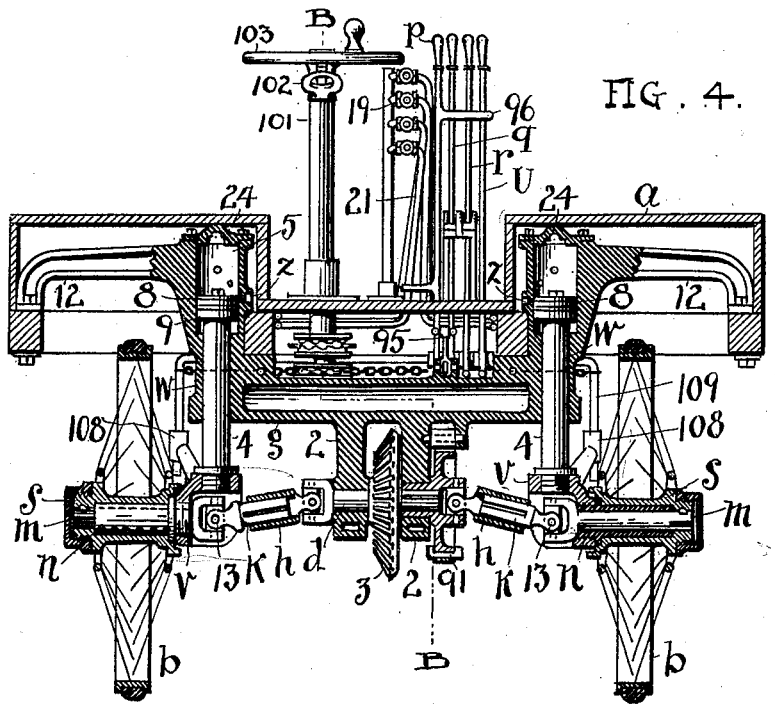
Figure 5:
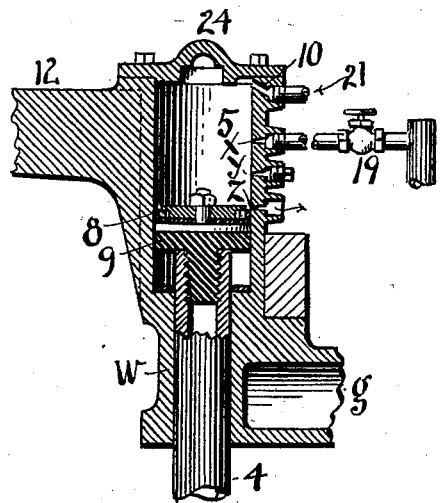
Figure 6:
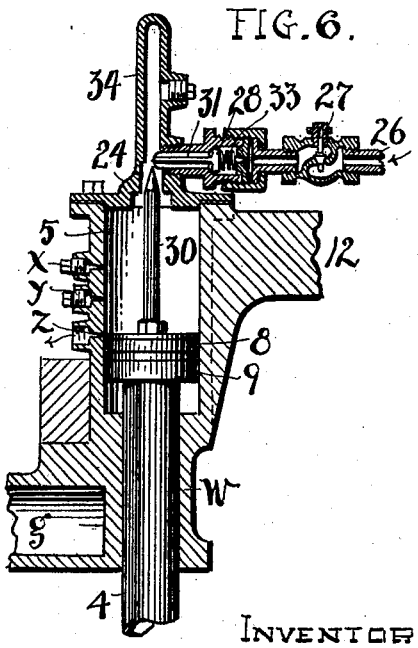
Figure 13:
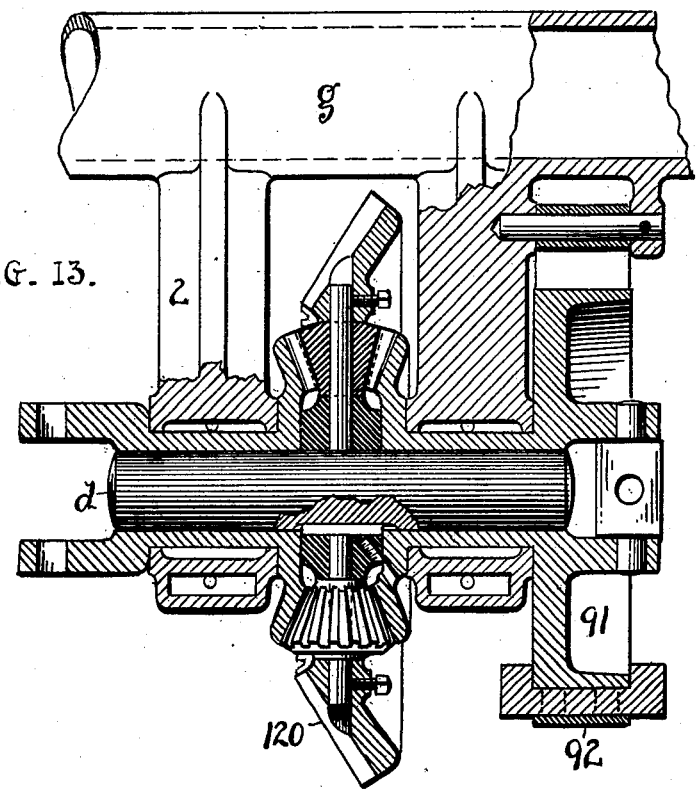
Figure 14:
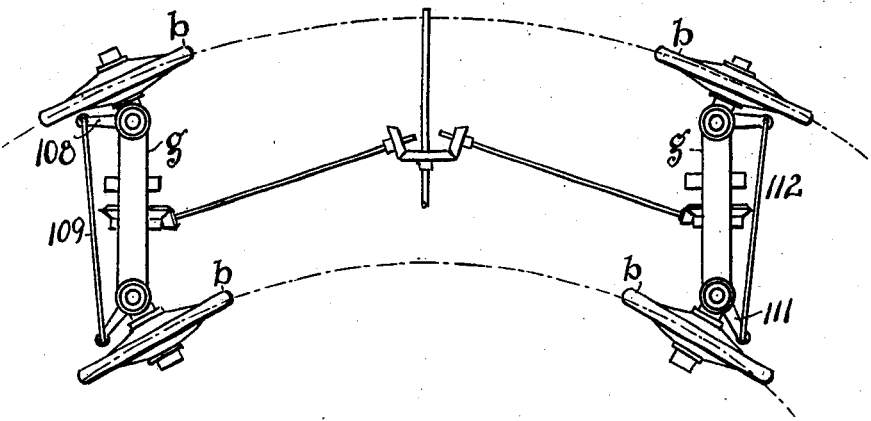

In the accompanying drawings, Figure 1 is a longitudinal sectional elevation of a vehicle embodying my invention, the extreme hind part being broken off for want of room. Fig. 2 is a plan view of the vehicle complete, except the hind part, (not shown in Fig. 1,) and with only one framework of the body, the floor being omitted to see the mechanism beneath. Fig. 3 is a plan view of the running-gear and propelling mechanism alone, parts thereof being horizontally sectioned to more clearly disclose constructions here and there. Fig. 4 is a vertical cross-section of the front running-gear and other parts on the axis of the front wheels corresponding to line A A, Fig. 2. Fig. 5 is a vertical sectional elevation, enlarged, of a part of Fig. 4; and Fig. 6 is a vertical section of a modification of mechanism corresponding to that shown in Fig. 4, as hereinafter fully described. Fig. 7, Sheet 1, is a side elevation of the engine and the pump connected therewith. Fig. 7ª is a longitudinal section of a pump-cylinder and its stationary piston, shown in elevation therein. Fig. 8 is an elevation, partly in section, of a modification of the supporting and cushioning mechanism for the body of the vehicle, showing the piston rigid with the spindle and outside the wheel. Fig. 9 shows a modification something like Fig. 8, but with the spindle on the cylinder and the cylinder outside the wheel. Fig. 10 is a side elevation, and Fig. 11 a plan view, of a still further modification along the lines of Figs. 8 and 9, but in which the wheel is outside the cushioning mechanism and the spindle-sleeve is rigid with the cushion-cylinder. Fig. 12 is a sectional elevation of the immediate air-cushioning parts shown in Figs. 10 and 11, as hereinafter fully described. Fig. 13 is a sectional elevation of a style of equalizing-gear which may be used on the short axle-shafts $d$ in certain cases, and Fig. 14 is a diagrammatic view illustrating the operation of the steering mechanism when both sets of wheels are operated simultaneously in turning the vehicle.

In the foregoing views I have purposely avoided illustrating a body-box or bed for the vehicle for the reason, chiefly, that the invention does not involve a body or bed, except as a medium of connection between the front and rear carriages and support for attached parts, and for the further reason that the invention is adapted to any style or variety of body or bed that taste or choice may elect. Mainly, however, the invention as here shown is designed for heavy vehicles, such as coaches for park service or for carrying heavy loads of passengers or freight in cities and other places and for traveling over rough and uneven roads. This accounts for what may seem a lack of compactness or unusual length of vehicle as compared with the prevailing automobile of the present day.

Referring now to Fig. 1, $a$ represents a plain platform, which may also be regarded as the bottom or frame of any suitable body or bed with which the vehicle may be furnished and which is built of such strength in itself or of framework as will adapt it to serve all the purposes for which it is intended. The two sets of wheels $b$, front and rear, are each connected by flexible extensible axle-shafts and wheel-supporting mechanism with which the bolsters above form an essential working part, as we shall see, and the said axle-shafts and wheel-supporting mechanism are duplicates of each other in all essential particulars. Each axle-shaft is constituted of several parts, comprising a short shaft $d$, supported in a pair of hangers 2, rigid with bolster $g$. Said bolster carries the platform or body of the vehicle and is a part thereof because it constitutes a part of the framework connecting the front and rear running-gears. A power-actuated gear 3 on short shaft $d$ comes between hangers 2, and the ends thereof are connected by knuckle-joints with sleeves $h$, into which extend plungers $k$, splined therein to move endwise, so as to accommodate the shaft to the up-and-down play or movement of the body. The outer ends of said plungers have knuckle-joint connection with drive-spindle or spindle member $m$, running in fixed tubular bearing-spindle or spindle member $n$, on which the carrying wheel or wheels $b$ rotate. The said wheels are turned by drive-spindle $m$, which is locked with the outer portion of hub $s$ by spline, key, or other means. The spindle member $n$ is rigid with head $v$, and by reason of this a rigid support is formed for the wheels, and they are held upright for work whichever way turned in travel or backing and are prevented from spreading laterally or apart from each other, notwithstanding their extensible axle-shafts. It will be seen that here I rely chiefly or wholly on pneumatic cushions or springs to carry the platform or body $a$, so I provide pneumatic chambers or cylinders 5, located in this form of the invention in extensions of body-bolster $g$ and in which the piston-rods 4 and pistons 8 operate. The piston-rods are shown here as tubular, but may be solid, and are rigid with wheel-sustaining heads $v$. They have long bearings $w$ between their ends in the bolster $g$, so as to receive all the strength requisite, both laterally and vertically, and prevent binding. This makes a practically rigid frame, comprising heads $v$, bolster $g$, piston-rods 4, and spindle-sleeves $n$, though said rod 4 is free to turn and to play up and down in the bolster—that is, it is rigid as to holding the wheels upright and preventing their spreading or running apart laterally, and this enables me to use an extensible and flexible axle-shaft for driving said wheels.

The fluid-inlet to the cushion-cylinder is at 10, Fig. 5, which brings the cushion or atmospheric pressure over piston 8 in this form of support. There is no pressure intended to be below said piston, and there are one or more outlets in the side of said chamber to give relief to the pressure, as we shall see. These outlets $x$ $y$ $z$ are arranged at successive elevations and may have valves or plugs controlling them, and both styles are shown here. The said piston-disk 8 is a separate member; but practically it is the same as if it were built rigid with the disk-shaped head 9 of the piston-rod, because the atmospheric pressure will always keep it down on said head. This, however, leaves the said piston free to be removed independently for any purpose, as for repacking, without disturbing any other parts. The head 9 has a stem threaded into the end of piston-rod 4, and in this particular also, as well as in all others pertaining to Figs. 1 to 5, the equipments, constructions, and arrangements of parts for the four corners of the platform $a$ and their air-cushions are all alike.

It will be noticed as a feature of the framework of the vehicle bottom or platform $a$ that it has laterally-extending supports on arms 12 integral with cylinder-casings 5 and bolster $g$, one at each corner, thus spreading the platform or body over the wheels and greatly widening it. Now referring again to wheels $b$, front and rear, and piston-rods 4, rigid with wheel-supporting heads $v$, it will be seen that the axis of rotation for said wheels for steering is the vertical axis of the piston-rods 4, so that the joint of knuckles 13 comes directly in line with this axis, and hence the wheels $b$ may be rotated either way, much or little, without causing any elongation or shortening of the axle-shaft between them; but said parts require play to adapt them to the up-and-down movement of the body, as already described, and hence the play of the plungers $k$ in sleeves $h$. Pneumatic-cushioning supporting being thus provided, the air may be furnished in one of three ways—viz., by one or more pumps for all the cylinders, by a separate pump for each cylinder, or by a supply of stored or compressed air for each or all of the cylinders. The construction now being described contemplates a pump for each cylinder. This enables me to hold the body of the vehicle at any desired level, regardless of how or where the load is distributed as to the wheels. Suppose, for example, that the load is mostly at one end. This would naturally depress that end down below the level of the other end and hold it down if there were no means for restoring the level by overcoming the load. It should be explained here that a common or normal level for the cylinders is fixed arbitrarily by the outlets $x$ $y$ $z$. In Fig. 5 the outlet is at $z$ and the higher orifices are closed. This is the common level for all the corners regardless of weight or lightness of load. The pumps referred to are operated while the vehicle is in use. So with a single pump for each corner the level of each corner is inevitably restored and sustained because pressure in the loaded corner or corners will continue to accumulate until at last it finds its common level at outlet $z$, which discharges only the surplus pressure. Thus I provide means for holding up all corners uniformly whatever the distribution of the load, and each cylinder has resources according to the exigences that may come upon it. Now, referring to Figs. 7 and 7$^a$, we find that there are four pumps $c$ on the outside of the power-engine 20, operated by an eccentric 22 on the engine-driven power-shaft 23. These pumps are connected by pipes 21 with the respective inlets 10 to the cylinders 5. If the vehicle stands and the pumps are quiet, there will be only a slight outflow of air from cylinders 5 before the pistons 8 will cover the outlets $z$ and prevent further escape. The same is true whichever of the three outlets is opened, and the operator can thus fix the level and cushion for the vehicle. In Fig. 5 I show an outlet-valve 19, by which the volume of air escaping can be fixed at any desired point within the capacity of the outlet-orifice. Cylinders 5 have heads or caps 24 at their top.

Fig. 6 shows a modification of the invention adapted to use stored air especially. Otherwise the parts are practically the same as in Fig. 4 above and are so marked. Hence there is an automatic control of the pressure atmosphere, which accomplishes about the same purpose as the separate pumps above. The inlet-pipe connections 26 have valves 27 and 28 to control the flow of air subject to the position of piston 8. Thus in Fig. 6 said piston is in sustained position just below orifice $z$ and has a stem 30 with a pointed end adapted to bear against the end of the fluted stem 31 of horizontal valve 26 in the air-passage. A spring 33 behind valve 28 holds it on its seat. A tubular tongue or projection 34 on the top of cap 24 carries the nipple in which valve 28 is located and affords operating room for the ends of said spindles, so that when piston 8 rises and closes the outlet-orifice $z$ it will engage and press the spindle 31 forcibly inward and open valve 28 to reëstablish conditions. Valve 27 will then open by pressure at its front and air will flow into cylinder 5, causing piston 8 to resume its proper working place. Other modifications of the bolster and cushioning parts are shown in Figs. 8 to 12. Thus in Fig. 8 the flexible axle-shaft is the same as before, except that knuckles 13 are connected directly in the ends of the wheel-hubs $s$, and thus rotatably engage the wheels; but the bolster has an elbow-arm 36 overhanging the wheel and an air-cushion cylinder 37 thereon outside the wheel. The piston and pivoting rod 35 is the same, substantially, as in Figs. 4 and 5, but is rigid with head 38 outside the wheel and carries spindle $t$, rigid therewith and on which the wheel turns. This head has an arm with a tubular bearing 39, supporting rod 40 of the steering mechanism, hereinafter described. Other parts are the same as in the first form described. In Fig. 9 the bolster has a gooseneck 42 overhanging the wheel to its outside and its lower end constituting the "piston-rod," so called, head 43, integral with wheel-spindle 44, and cushioning-cylinder 45, having the said head and spindle rigid therewith. The combined piston and pivoting rod 47 is constituted by an extension of neck 42 and has piston 8 at its ends, and in this case, as also in Fig. 10, the cushion-cylinder extends below the hub of the wheel. The steering connections are made by curved rod 49, engaged to an arm on the collar at the top of cylinder 45, so that in steering the vehicle said cylinder rotates on said rod 49 and the wheel $b$ is turned accordingly one way or the other. There is also a tubular bolster 50 in this view rather than one of solid casting, and air is supplied to the cylinder from a pump through internal pipe 41. Cylinder 45 has outlets $x\ y\ z$, as before described. In Figs. 10, 11, and 12 I show a modification having a tubular bolster 50, as in Fig. 9. Here also downwardly-bent portions of the bolster constitute the combined piston and pivot rod over which cushioning-cylinder 53 is sleeved and adapted to operate, as in the foregoing views. However, the cushion comes inside the wheels again and the wheel-spindles 54 are rotatively supported in bearings 52 on the outside of cylinders 53. Hence the spindles are off the vertical axis of said cylinder. Said cylinder affords engagement for the connecting-rod 56 for steering the vehicle. A plug 57 in the lower end of the piston-rod carries the piston proper, 8, and a valve 58 is seated in the top of said plug and has its stem 59 constructed to pass air beneath said plug into cylinder 53. Said stem projects centrally through and below the plug to contact with the bottom of cylinder 53, so that when the air in said cylinder becomes reduced below the desired pressure the lower end of the valve strikes the bottom of cylinder 53, raises valve 58, and lets in more compressed air. Then the cylinder rises and the valve closes again. An orifice $z$ fixes the limit of movement. In these views air is supplied through the piston-tube and from a supply of compressed air filling tube 50 above the valve 58. However, a single-pump connection also will work with this construction. These several modifications, Figs. 8 to 12, inclusive, serve especially to show that the invention may be very widely and radically varied in respect to the construction, arrangement, and operation of parts and yet be within the spirit and object of the invention. The power-transmitting mechanism for all these forms is arranged midway between the axles beneath body $a$ and about and upon power-shaft 23, which is driven directly by engine 20. This shaft is suspended from the bottom or body $a$ in suitable bearings and is equipped with gear connections for three rates of speed, the power in all instances being transmitted to both vehicle-axle shafts at exactly the same speed, whatever it may be. To these several ends there are splined on shaft 23 two differential gears 61 and 62 and the third and largest of this series 63 on sleeve 60 about said shaft. Gear 61 meshes with gear 71 on shaft 70, gear 62 with gear 72 on shaft 64, and gear 63 with the two equal gears 65 and 66, splined on shafts 64 and 70, respectively. All the several gears thus enumerated are concavo-convex in shape and constructed to work with shafts 64 and 70, placed at an inclination to the line of travel relatively, as seen in Fig. 3. Each shaft 23, 64, and 70 is equipped with friction-clutches, which may be of any suitable kind. In this instance there are three cones 67, 68, and 69. Cone 67 is on gear 71, sleeved on shaft 70, cone 68 on gear 72, sleeved on shaft 64, and cone 69 keyed on tube or sleeve 60 about shaft 23 and carrying gear 63, rigid therewith. These several cones are adapted to be brought into locking engagement each with its own friction-engaging cup 77, 78, and 79, respectively. The said friction-cups are adapted to slide on and rotate with the shafts on which they are mounted, and each cup is provided with operating connections from levers $q$, $r$, and $u$ at the front of the vehicle and rods 80, 81, and 82 from said levers to the cup-engaging levers or equivalent members 83, 84, and 85, Fig. 2. Thus the lever for each friction-clutch is within direct and easy reach of the operator, and all the clutches run free except as they are purposely engaged through the operating-levers. It will be noticed that gears 61, 62, and 63 are of gradually-increasing sizes and serve to determine the rates of speed, the slowest being through gear 61 and the fastest through gear 63. The operating connections for these gears and speeds are as follows in such cases: Locking-cones 67 and 77 engage gear 71 with 61, which rotates shaft 70. Then since gear 65 is splined on shaft 70 it transmits power to shaft 64 through gears 63 and 66, splined on their shafts. This gives the slowest speed. For medium speed cones 68 and 78 are locked, and gear 66, splined on the shaft 64, is operatively engaged with gear 62, splined on the power-shaft through gear 72. Then shaft 70 is driven through gear 65, splined thereon, meshing with gear 63, and gear 63 meshes with gear 66 and is driven thereby. If the maximum speed be wanted, cones 69 and 79 are locked, which rotates gear 63 through sleeve 60, and thus both shafts 64 and 70 are rotated through gears 65 and 66 splined thereon. By means of friction-clutches I can make the changes in speed without doing violence to the parts or imparting shock to the vehicle, and one speed can be taking hold while the other is letting go. Of course I am aware that, broadly, friction-clutches are not new in this art; but my invention I believe to be new.

Referring now again to the vehicle-axle shafts, we find a bevel-gear 3 on each, which is meshed with or by a bevel-pinion 87 on each driven shaft 64 and 70. Said shafts 64 and 70 are supported at their respective ends in bearings 88 on the vehicle axle or body $a$ at one end and in a suitable bearing 89 at the other end, serving also as a support for power-shaft 23 from the vehicle body or bottom $a$. Power is applied by the foregoing mechanism through either of the front levers $q$ $r$ $u$, arranged side by side and in line with brake-lever $p$. This lever applies both the front and rear brakes, which consist, as here shown, of brake rings or wheels 91 on the axle-shafts and brake-bands 92, Fig. 11, arranged to work around or upon said rings and having one end fixed to the vehicle-bolster and the other to the crank-levers 95, connecting rods 93 or 94 with said bands. The said rods are pivoted to an equalizing-bolster, and rod 94 goes back to the rear brake, while rod 93 goes to the front brake. Brake-lever $p$ has a lateral arm 96, which prevents the tightening of the brake without first having taken off all the power through levers $q$, $r$, and $u$, and this arm also prevents the application of power through any one of said levers without first releasing the brake. This will be understood, because all the levers are forward when the brake is on. Then to draw any power-lever back to apply power the brake-lever must first be released and drawn back out of the way. So in case the brake is to be set its arm would strike any power-lever on at the time and require its being thrown forward to open position before the brake could be set. In either case therefore the way must be cleared before either lever can be operated.

For steering the vehicle I provide a dual mechanism, so that either one or both sets of wheels can be controlled at the same time, as may be preferred. To this end there is an upright steering-shaft 100 at the front of the vehicle, inclosed part way by a tube 101, Fig. 1. A pivoted handle 102 on said tube is temporarily locked with wheel 103 on shaft 100, and both shaft and tube have separate sheaves or sprocket-wheels 104 and 105, respectively, rigid on their lower ends. A chain 106 goes from sheave 104 over guide-sheaves to each end of bar 109, which connects arms or levers 108 rigid with heads $v$. Hence if said sheave or sprocket be turned one way it will turn the front wheels $b$ correspondingly, and if it be turned the other way it will turn said wheels in the opposite direction. This is at the front. A similar connection goes by chains and rods 110 from sheave 105, carried by tube 101 to the rear wheels. Here arms 111, rigid with heads $v$, connected by bar 112, serve to throw the rear wheels in either direction or to fix them in line with the front ones, according as they are operated through handle 102 and the intermediate mechanism. Thus either the front or the rear wheels may be turned alone, if preferred, the handle 102 being disengaged from wheel 103 when separate movement occurs. Then said handle will turn tube 101 alone and its sheave and chain, and wheel 103 will turn shaft 100 alone and its wheel and chain; but when both sets of wheels are to be turned together the wheel and handle are left locked together, as shown in Fig. 1, and this is their usual and natural relation. Of course the steering connections are such that the wheels in each set are turned in opposite directions when both sets of wheels are operated. Obviously, the parts for steering the vehicle can be considerably varied and not depart from the invention. The valved outlet from the air-cushion cylinder enables the operator to let out as much air as he wants to at either side to keep the body of the vehicle nearer a level while running on hilly or side slanting roads and to prevent possible tilting over of the vehicle by reason of excessive side inclinations, side loading, and the like. The object of turning or steering both front and rear wheels is, first, to turn very short with a long vehicle; second, to make the front and rear wheels travel the same distance when turning, so that neither pair of wheels will have to slip on the ground when turning. For example, if the vehicle be going forward and turns a corner and is steered by the front wheels alone the front wheels will travel farther than the rear ones, and all the wheels being geared together the wheels will have to slip on the ground to accommodate the difference. This makes a great loss of power, and if rubber tires be used it greatly injures them and makes a heavy strain on the gearing between each pair of wheels. On the other hand, by steering with both the front and rear wheels each pair of wheels travels the same distance; but the outside wheel of each pair travels farther than the inside ones, and so if they are rigidly connected there will be a slip on the ground to accommodate the difference in travel. This is not so great and is not so objectionable as the other method of turning, especially if smooth metallic tires be used. Then again there are times when one wheel gets on a slippery place and the other three wheels have to propel the load, and sometimes even three wheels are on a very slippery place and will slide and the fourth while having a good hold on the ground must propel the vehicle alone; but if rubber tires be used it is very injurious to them to slip on the ground. Therefore as a compensating medium I show in Fig. 13 an equalizing-gear 120, adapted to be used in the axle-shafts in lieu of gear 3, so that when both ends of the vehicle are steered and turning all four carrying-wheels b can travel free and are not compelled to slip for any of the reasons hereinbefore set forth. This form of gear is necessary when rubber tires are used; but there are many cases where rubber tires are not needed and smooth metallic tires are used, and for such vehicles the equalizing-gear is not needed. This is true for the reason that if such gears were used and the vehicle was running straight ahead and one front wheel got on a slippery place and slipped it would throw the propelling power off the other front wheel and the two rear wheels would have to do the propelling, or if one front wheel and one rear wheel on the same side were on a very slippery place and would slip so as not to propel and the other two wheels were on good footing and had a propelling hold they would not propel and the vehicle would stop and be stalled. If the equalizing gear is not used, all four wheels will have to slip before the vehicle will stall for lack of foot-hold for propelling. When the equalizing-gear is used, as many brake-wheels can also be used, as desired, after the manner shown in Fig. 4, where brake-wheel 91 is mounted on and revolves with short shaft d. The offset or different diameter in the pivoting and cushioning cylinder, Fig. 5, is mainly to prevent the rod from falling too low if the wheel should drop into a low place when running. This is not a necessity and can be done outside, as shown in Figs. 8 and 9, by a stop on the steering-rod lever.

To back the vehicle, simply reverse the engine, when it will run backward as well as forward.

The equalizing-gear 120, when used, can be locked together, so that both ends or parts of the driven axle-shaft will work together the same as one shaft. Otherwise said shaft divides at or in said gear and in this differs from the other constructions of shaft shown. This locking of the shaft into one is especially advantageous in muddy or slippery roads when rubber tires are used.

A number of advantages are obtained by this invention, among which may be mentioned the bringing of the air-cushion or spring which sustains the vehicle axially in line with the support, so that the air cushions the support and in this instance forms part of the support. Then there is also the advantage of making the wheels take all the impact or shock that comes from the striking of obstructions and so that the wheels absorb the shock and do not transmit it to any of the other parts. This is because the air-cushion prevents transmission to the body and the flexible shaft prevents transmission to the power-gears. Hence the wheels and their spindles are isolated from the other parts by yielding means which will not communicate the jars and difficulties they encounter, and thus the vehicle as a whole other than the wheels and spindles are kept quiet in travel even over rough roads. In addition to these is the carrying of the body or load at any desired elevation, approximately, regardless of weight or lightness of load; also, to cushion wide apart for high speed and for carrying top-heavy loads over rough rutting roads, so as to prevent liability of tipping over, as in Figs. 8 and 9. This brings the cushions outside the carrying-wheels. The cushioning and pivoting inside of the wheels is for compactness, while pivoting outside gives more room and safety. The steering-wheels can be turned more or farther than when the pivot is outside. Inside pivots are better for compact loads, slow speed, and short turning. The outside pivots are better for rough roads and high speed and bulky top-heavy loads and where short turning is not so essential. By "pivots" I mean rotation on the axis of the cushioning mechanism.

I might, if I preferred, introduce metallic springs in the cushion-cylinders to carry the load in case the air for any reason should fail; but it would be only a reserve spring for emergencies and would not be in action when the air-cushion was present. This spring preferably is placed in the pneumatic chamber.

Fig. 14 shows by a diagram how the wheels of both sets are turned by the steering mechanism in opposite directions to turn the vehicle a given way. It is the reverse of this in turning another way.

The term "spindle" or "spindle member" as used herein refers to the immediate or intermediate support for the wheels and in the types of the invention illustrated herein is rigid with one of the upright members of the pneumatic cushion. As such, it affords a bearing by which the wheel is held upright and in a sense rigid, although horizontal rotation is afforded through the upright member to which the spindle member is rigidly affixed. Said spindle or spindle member is therefore referred to herein also as a support or bearing for the wheel, which it is directly or indirectly, according to the construction of the parts.

It will be understood that the so-called "axle-shafts" are power-driven members and are, therefore, also referred to as "shafts;" but they also sustain the relation of axles in or to the vehicle.

The mechanism for communicating power from the engine or drive-shaft to the axle-shafts has been somewhat minutely described herein, so as to clearly bring out the exact construction of parts shown and herein used for this purpose; but it should also be understood that I do not consider this as the only means for communicating power from the engine to said axle-shafts and that I may use any one of a great variety of equal or equivalent mechanisms for the said purpose, even though some of them might bear no resemblance whatever to the special mechanism here shown. The claims should therefore be interpreted as compassing all equivalent means or mechanisms for transmitting power between drive-shaft and driven axle-shafts as contemplated in this paragraph.

What I claim is—

1. A vehicle-body and wheel-supports, and automatically-controlled pneumatic cushioning and supporting means interposed between said body and wheel-supports, said means adapted to increase or decrease the pneumatic pressure therein, substantially as described.

2. A vehicle-body and wheel-supports, and a controlled pneumatic cushioning and supporting mechanism for the body on said supports, said mechanism comprising a cylinder having the air free therein, and a packed piston-rod in the cylinder and one of said parts adapted to rotate in respect to the other for steering, substantially as described.

3. The vehicle-body and the wheel-bearing, and a pneumatic support and cushion between said body and bearing comprising a cylinder having air liberated therein to form said cushion, and a piston-rod exposed to the air in the cylinder, one of said parts being rigid with said bearing and the other with said body, said cylinder having an air-inlet and an outlet, and controlled by the position of the body in respect to the bearing, substantially as described.

4. A vehicle-body and wheel-bearings, and a pneumatic cushioning device consisting essentially of a cylinder rigid with said body and a piston rigid with a wheel-bearing, said cushioning devices rotatable one in respect to the other on a vertical axis, and the cylinder unobstructed within to afford an exclusively-pneumatic cushion for the piston for supporting the body, and means to control the pressure of the air in said cylinder, substantially as described.

5. In a vehicle, a body and a flexible axle, in combination with a cushioning mechanism for supporting the body comprising a cylinder and a piston-rod confining the cushioning-air between them, means to control the said cushioning-air for suspending the body, and one of said parts being rigid with the body and the other rotatable in respect thereto for steering, substantially as described.

6. In vehicles, a body and wheel-supports, and a pneumatic support and cushion between said body and supports comprising a compression-cylinder rigid with one of said parts and a piston and rod connected with the other part and confining the supporting and cushioning air between them, the said cylinder and piston and rod being rotatively engaged one with the other, whereby the wheels can be turned for steering, and the cylinder having an air-opening into the air-space therein and the air acted upon by the piston, and means to automatically control said air-opening, substantially as described.

7. A vehicle-body and axle-shafts having spindles jointed on their ends, in combination with pneumatic cushioning mechanism supporting the body on the spindles and constructed to allow the spindles to rotate horizontally, said axle-shafts having extensible connections to allow for up-and-down play of the vehicle-body wheels, substantially as described.

8. A vehicle-body and jointed axle-shafts, and pneumatic supports for the body rigid at their lower ends with the spindles on said axle-shafts, and means to apply power to said axle-shafts, substantially as described.

9. In vehicles, a pneumatic cushion for supporting the body of the vehicle comprising a cylinder having inlet and outlet openings for the cushioning fluid, a piston working in said cylinder and means to maintain a pressure on said piston to keep it at outlet-opening, substantially as described.

10. A pneumatic cylinder having an inlet at one end and a series of outlet-openings between its ends, pneumatic members consisting of a piston-rod and piston in said cylinder and means to force air into the cylinder to sustain a load, in combination with a vehicle having flexible axle-shafts and wheel-spindles on said axle-shafts having each a vertical axis of rotation in the axis of the pneumatic member connected therewith, substantially as described.

11. In a vehicle, a series of pneumatic cushions for the body of the vehicle, and separate pump and pipe connections therefrom to each cushion, and means for automatically controlling the pressure of each cushion for suspending the body at a normal point, substantially as described.

12. A vehicle and a series of pneumatic cylinders and pistons therein constructed to carry a load, said cylinders having each an inlet at one end and outlets at their sides, and a separate pump for each cylinder, substantially as described.

13. In vehicles, a set of axle-shafts and propelling mechanism therefor comprising a drive-shaft and a series of differential gears to graduate speed, and transmitting-gears and a pair of shafts arranged to make power connection with any one of said differential gears and with both axle-shafts, substantially as described.

14. A vehicle and propelling mechanism consisting of a drive-shaft and a series of differential gears thereon, a pair of driven shafts geared up with each axle of the vehicle and a separate friction-clutch and intervening mechanism to make driving engagement with each one of said differential gears, substantially as described.

15. The vehicle and its axle-shafts, the drive-shaft and a pair of driven shafts one for each axle-shaft geared therewith, a series of gears on the drive-shafts to change the speed and means to throw any one of said gears into power connection with said driven shafts, substantially as described.

16. In a power-driven vehicle, a drive-shaft and a sleeve thereon and a gear and a clutch fixed on said sleeve to rotate therewith, in combination with a set of driven shafts geared with the axle-shafts and a gear on each driven shaft meshing with the gear on said sleeve, substantially as described.

17. A vehicle and its axle-shaft, transverse drive-shafts and gears thereon, and driven shafts geared therewith and with each axle-shaft, and a clutch on each driven shaft and a gear thereon rigid with one member of said clutch, substantially as described.

18. The vehicle and its axle-shafts and the driven shafts and gears connecting said shafts, in combination with a drive-shaft, a series of gears splined thereon, and a set of gears on each driven shaft in mesh therewith, and a series of friction-clutches on said drive and driven shafts to make working connection through any one of the several gears on the drive-shaft, substantially as described.

19. In a power-driven vehicle, a set of flexible axle-shafts and wheels thereon, in combination with a steering mechanism comprising rotatable sheaves, connected arms rigid with the spindles of each set of wheels, flexible connections from said sheaves to said arms, and means to rotate said sheaves, substantially as described.

20. In a power-vehicle, a suitable body or bed and carrying-wheels, flexible extensible axle-shafts connecting said wheels, power connections to said axle-shafts, and pneumatic cushioning mechanism supporting said body on said wheels, and having one of its members loosely connected with the ends of said axle-shafts, substantially as described.

21. In a vehicle, a pneumatic cushion for supporting the body of the vehicle comprising a cylinder and a piston therein, said cylinder having an air-inlet on one side of the piston and an air-outlet on the same side, and means to sustain the air-pressure in the cylinder, whereby the desired pressure and equilibrium between said cylinder and piston is maintained, substantially as described.

22. In automobile vehicles, a set of wheels and a body and pneumatic cushions supporting the body on said wheels, and pneumatic pressure-sustaining mechanism to hold up all the corners of the body to the same level regardless of the load thereon, said mechanism comprising a pneumatic pump or pumps or a tank of compressed air, substantially as described.

23. In a power-driven vehicle, a vehicle-body, a flexible axle-shaft having spindles at its ends, wheels mounted on said spindles and automatically-controlled pneumatic cushions connecting the wheels with the body of the vehicle and constructed to hold the wheels upright, substantially as described.

24. In vehicles, front and rear wheels and flexible axle-shafts and driven equalizing-gears thereon, and steering mechanism connecting said wheels and constructed to turn each set of wheels in an opposite direction from the other set at the same time and the same distance, said steering mechanism comprising a combined cushioning and rotary pivoting-cylinder, and a laterally-supported piston in said cylinder, and the body of the vehicle rigid with one of said parts and the piston rigid with the other of said parts, substantially as described.

25. In automobile vehicles, a body and wheel-supports and carrying-wheels thereon, means for cushioning and pivoting said wheel-supports to the body comprising a cylinder and a piston-rod rotatably connected, and an automatically-controlled air-cushion between them, one of said parts being rigid with the body and the other part being rigid with the wheel-supports, and means for turning said wheel-supports for steering, substantially as described.

26. In automobile vehicles, a body and wheel-supports and carrying-wheels thereon, means for cushioning and pivoting said wheel-supports on the body comprising a cylinder and a piston-rod rotatably connected, one of said parts being rigid with the body and the other part rigid with the wheel-supports, flexible power-driven axle-shafts operatively connected and connecting the wheels and means connecting the wheel-supports for steering each pair of wheels the same distance at the same times and in opposite directions, substantially as described.

27. In automobile vehicles, a frame and a pair of carrying-wheels for each end vertically and pivotally connected to the frame by wheel-supports outside of the wheels for steering, and driven flexible axle-shafts connecting the inner ends of the hubs of each pair of wheels for driving the vehicle, substantially as described.

28. In automobile vehicles, a frame and a pair of carrying-wheels vertically and pivotally connected outside the wheels to the frame by wheel-supports for steering and holding the wheels upright, and a driven flexible axle-shaft connecting the inner ends of the hub of the wheels to drive them, substantially as described.

29. In automobile vehicles, a body and a pair of carrying-wheels for each end, and wheel-supports pneumatically cushioned and pivoted vertically to the body outside of the wheels, and the wheels mounted on the inward-projecting spindles of said wheel-supports, and a power-driven flexible and extensible axle-shaft connecting the inner sides of the wheels to drive them, all substantially as described.

30. In automobile vehicles, a body and a pair of carrying-wheels, and wheel-supports cushioned and pivoted vertically to the body outside of the wheels and the wheels mounted on the inward-projecting spindles of said wheel-supports, and a power-driven flexible and extensible axle-shaft connecting the inner side of the wheels to drive them, substantially as described.

31. In automobile vehicles, a body and sleeved wheel-supports and wheels mounted thereon, said supports pneumatically cushioned and pivotally connected vertically to the body for steering and holding the wheels upright, and a driven flexible and extensible axle-shaft extending through said sleeved wheel-supports and connecting the wheels to drive them, substantially as described.

32. In automobile vehicles, the combination of a body and sleeved wheel-supports and wheels mounted thereon, said supports cushioned and pivotally connected vertically to the body for steering and holding the wheels upright, and a driven flexible and extensible axle-shaft extending through the said sleeved supports and connecting the wheels for driving them, substantially as described.

33. In automobile vehicles, a body and wheel-supports and carrying-wheels thereon, means for cushioning and pivoting said wheel-supports to the body comprising a cylinder and a rod rotatably connected, and means for cushioning between them, one of said parts being rigid with the body and the other part rigid with the wheel-supports, and flexible power-driven axle-shafts connecting said wheels, substantially as described.

Witness my hand to the foregoing specification this 28th day of November, 1900.

MELVIN A. YEAKLEY.

Witnesses:
 M. A. SHEEHAN,
 R. B. MOSER.